APPARATUS FOR PHOTOGRAPHIC COLOR REPRODUCTION

Original Filed Sept. 24, 1964 2 Sheets-Sheet 1

INVENTOR.
EDWARD R. ATKINSON
BY
Robert S. McMorrow
ATTORNEYS

INVENTOR
EDWARD R. ATKINSON

BY Robert G. McMorrow
ATTORNEYS

United States Patent Office 3,395,611

Patented Aug. 6, 1968

3,395,611

APPARATUS FOR PHOTOGRAPHIC COLOR REPRODUCTION

Edward Robert Atkinson, 366 S. Troy St., Aurora, Colo. 80010

Original application Sept. 24, 1964, Ser. No. 400,636. Divided and this application May 26, 1966, Ser. No. 553,078

8 Claims. (Cl. 88—24)

ABSTRACT OF THE DISCLOSURE

Color photoreproductions having constant color contrast and density range from color originals having varying interference factors involving an apparatus including a constant temperature, constant intensity light source, means carried by the light source for measuring the light intensity of said source, means positioned between the object and image plane for sensing the intensity of light transmitted therebetween and means for moving said light source relative to said color original to maintain the light intensity constant at the photosensitive surface at the image plane regardless of the interference factor of each original being processed. Compensation means for the different emulsion characteristics of the photosensitive surface may be selectively inserted into the light intensity sensing means at the image plane.

This application is a division of copending application Ser. No. 400,636, filed Sept. 24, 1964.

This invention relates to a method and apparatus for color reproduction for use in photoengraving, rotogravure, and offset printing processes, and more particularly to a photographic reproduction process in which the transmission of light is closely controlled to produce a series of color negatives or positives which are both color and tone corrected to ensure constant contrast and density range.

While the present invention has application to many color photographic reproduction areas, it has particular applicability to photo-mechanical reproduction processes involving multiple color printing. In such processes, color printing is achieved through the use of various color inks, such as yellow, cyan and magenta. Normally, these ink colors are inadequate to achieve exact reproduction in which both color and tone are identical to the original. Since some of the colors of the original do not transmit or reflect light equally, it is exceedingly difficult to achieve a photographic color reproduction which is identical to the original. Variations in contrast and density range occur within a single print and between any two prints of a series.

In the past, especially where it is necessary to provide a number of color separation negatives, the production of these negatives has been made on a hit-and-miss basis with a relatively high error rate causing a great number of make-overs before satisfactory results are achieved. Techniques involving premasking, masks, high lighters, gray scales, color patches and register marks are required involving a great number of individual operations. In one particular layout employing four color pictures, 52 separate operations are required to produce the final color separation positives. Since the value of light transmission of both reflective opaque originals, or transparent originals, differs greatly depending upon the relative density of the print as well as the magnitude of the different colors making up the print, it requires a rather experienced photographer to take into account the differences in light transmission or light reflectivity and to thereby vary the conditions of the photographic process to attempt to achieve color reproductions of any consistency.

In dealing with transparencies, for example, it is quite apparent that each transparency will allow greater or lesser transmission of light through the transparency depending upon the relative density, color, tone, etc. Therefore, each transparency has its own "interference factor." The present invention is directed to the application of the law of the interference factor; that is, by adjusting the source of light to vary either the brilliance thereof, or by positioning a constant intensity light source at a varying distance with respect to the transparency and achieving constant transmitted light intensity at the point where he focal image is formed on the sensitive photographic paper or emulsion, which may be either of the positive or negative type, a constant contrast and density range may be achieved regardless of the interference factor of each transparency so photographed. This also holds true for opaque color originals. It is, therefore, a primary object of this invention to provide an improved method and apparatus for use in producing a series of color photo reproductions characterized by each of the reproductions having constant contrast and density range regardless of the interference factor of each original so processed.

It is a further object of the invention to provide an improved method and apparatus for producing a series of color photo reproductions from a plurality of original prints having varying interference factors in which the photo reproductions may be color and tone corrected by controlling the intensity of light transmitted to the photosensitized surface at the image plane.

It is another object of this invention to provide an improved method and apparatus for producing a series of color photo reproductions having constant contrast and density range which is particularly applicable to the production of color separation positives.

It is still a further object of this invention to provide an improved method and apparatus for producing a series of color photo separation positives having constant contrast and density range which completely eliminates the need for color separation negatives, premasking, masks, high lighters, gray scales, color patches and register marks at the commencement of reproduction and avoids the necessity of making preliminary measurements of the transparencies and recording the density ranges prior to initiating the photo reproduction process.

It is yet another object of this invention to provide an improved method and apparatus for the production of a series of color photo reproductions characterized by constant contrast and density range which enables the operator to have complete control at all times of density ranges, contrast, light intensity, light output and light temperature.

It is a further object of this invention to provide an improved color photo reproduction method and apparatus for use in photomechanical reproduction involving multiprintings in which the number of operations is greatly reduced and the need for make-overs is practically eliminated.

It is a further object of this invention to provide an improved method and apparatus for the production of a series of color separation positives or negatives characterized by constant contrast and density range which compensates for the failure of conventional filters to filter out all of the unwanted colors during the production of respective individual monotone color separation positives and negatives.

It is a further object of this invention to provide an improved method and apparatus for the production of a series of color photo separation positives and negatives having constant contrast and density range in which the light intensity measuring system includes compensation means for varying sensitivity characteristics of different emulsions which may be used during the reproduction process.

Other objects of this invention will be pointed out in the following detailed description and claims and illustrated in the accompanying drawings, which disclose, by way of example, the principle of the invention and the best modes which have been contemplated of applying that principle.

Figures 2, 3:
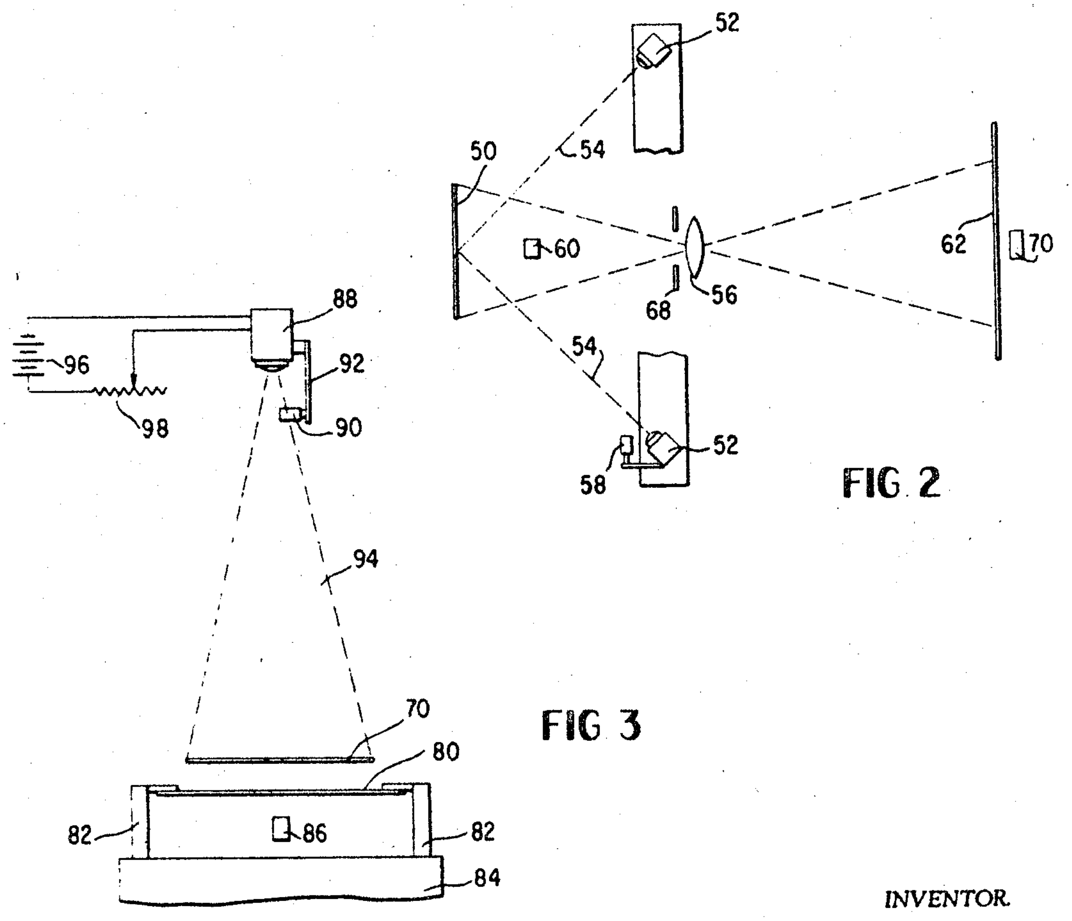
FIGURE 2 is a schematic, elevational view of the apparatus of a second embodiment of the present invention for effecting the photographic reproduction in the form of a color positive or negative of an opaque original by the reflection process of the present invention.
FIGURE 3 is a schematic, elevational view of the apparatus of another embodiment of the present invention for use in the production of color separation positives or negatives by a contact process from a color transparency produced by the apparatus of either FIGURE 1 or FIGURE 2.
Figures 4, 5, 6, 7, 8:
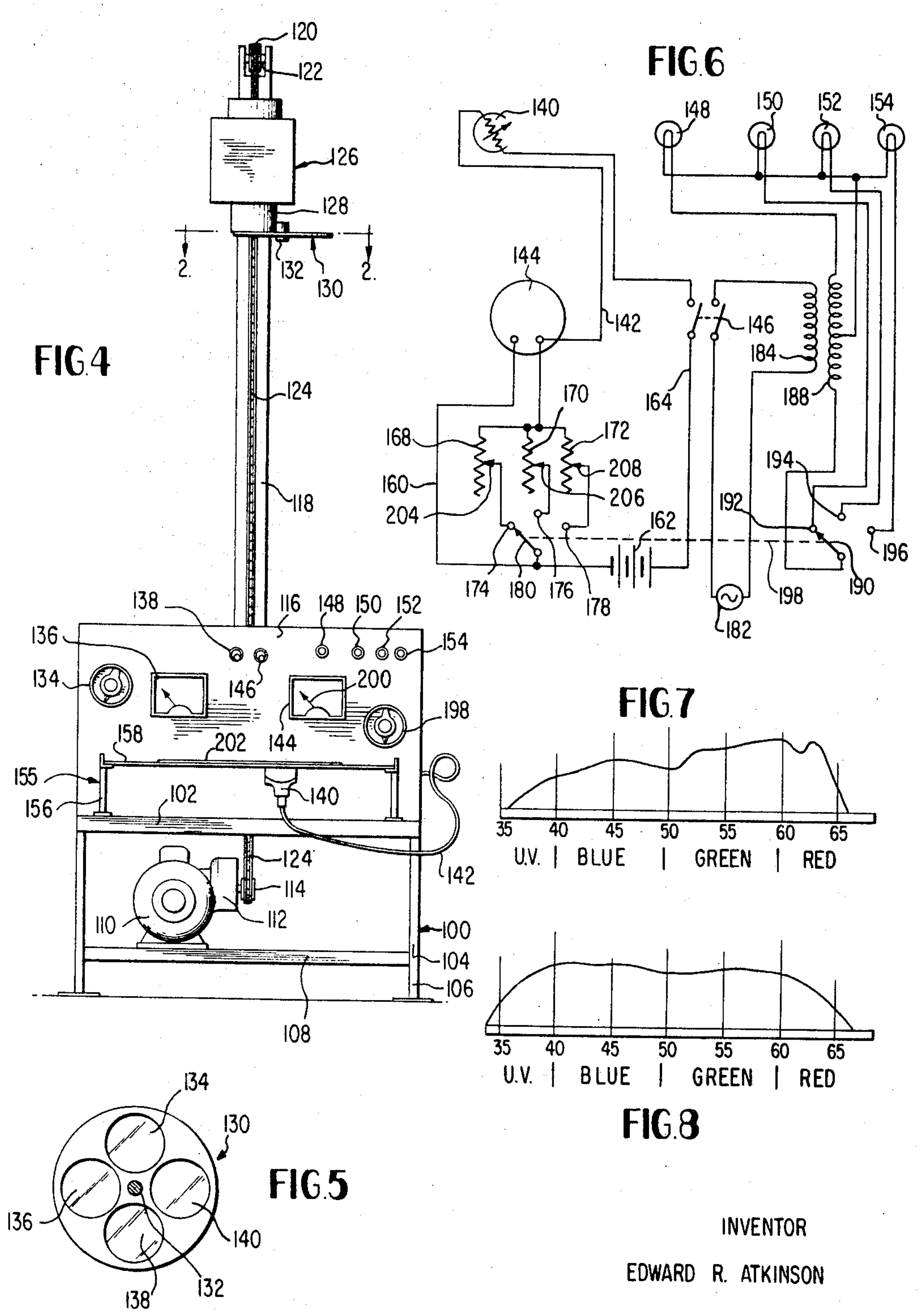

FIGURE 4 is an elevational view of the form of the apparatus shown in FIGURE 3 employing means for compensating for the differing emulsion characteristic of the film with respect to the production of color separation prints whereby a constant light intensity meter reading is indicated for each color regardless of the particular color sensitivity characteristic of the emulsion and regardless of which one of the many commercial emulsions is used.

FIGURE 5 is a plan view taken along lines 5—5 of FIGURE 4 showing the rotatable color filter assembly which is moved into position to make the separate color separation print.

FIGURE 6 is a schematic view of the electrical circuit for measuring the intensity of the transmitted light at the focal plane of the apparatus shown in FIGURE 4.

FIGURE 7 is a wedge spectrogram showing the emulsion sensitivity characteristic of Ilford FP3 roll film.

FIGURE 8 is a wedge spectrogram showing the emulsion sensitivity characteristics of a common panchromatic film manufactured by the Eastman Kodak Company.

In general, the method and apparatus of the present invention employs the application of the law of the interference factor in which the light intensity is adjusted with respect to the original to maintain the light transmission constant at the image plane where the photographically sensitive surface is positioned to ultimately effect the production of a series of color separation positives which are constant in both color and tone. When photographing transparencies, the light intensity of the source is held constant and its position with respect to the transparency is varied to effect constant light intensity transmission to the image plane. In photographing an opaque color original by the reflection method, the position of the light source with respect to the copy is varied, whereby a constant angle of reflection is achieved to effect constant light intensity at the image plane. An original negative produced in the manner above, under controlled conditions, may be used subsequently to produce a color separation positive having controlled color, tone, density range and contrast by further use of the interference factor theory. The negative is placed on a clear sheet of acetate, supported by a glass support member on the top of a conventional contact process vacuum frame, but spaced therefrom. Means are provided for determining the intensity of light transmitted through the color negative, and by adjusting the light source, the proper light intensity at this point is achieved. The remaining process technique is conventional in nature. Where color separation positives are to be made by the contact process, the proper inclusion of appropriate color filters at the light source and variation in light intensity and/or variation in the position of the light source achieves constant light transmission at the image plane. Varying light intensity at the image plane will provide color and tone correction, i.e., will vary contrast and density range, and thus may be utilized to compensate for color or color and tone imperfections of the reproducing process.

Advantageously, means may be included in the light intensity measuring circuit whereby the meter reading remains constant regardless of the particular monotone color separation positive or negative being produced or the type of the commercial emulsion used to form the print to automatically provide color separation positives or negatives having the desired constant contrast and density range.

The principles of this invention will be shown as applied to preferred embodiments. However, it is not the intention to be limited to the embodiment shown, and the present invention has broad application to all color photographic reproduction processes where density range and contrast control are desirable.

Figure 1:
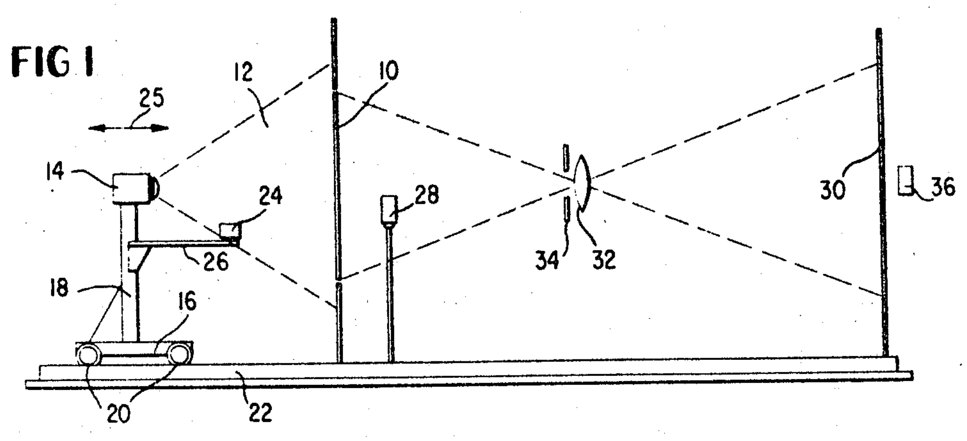
FIGURE 1 is a schematic, elevational view of an apparatus forming one embodiment of the present invention for producing a photo reproduction, either negative or positive, or a color transparency by the method of the present invention.

Referring to FIGURE 1, there is shown in the preferred form the improved apparatus of the present invention used in the production of a color negative or positive having controlled, constant contrast and density range, the color negative or positive being made from an original color transparency. The color transparency, indicated at 10, is positioned in the path of light beam 12 emanating from a light source 14 which is fixed to a movable support platform 16 by conventional support means 18. The platform 16 is movable with respect to the fixed transparency 10, as indicated in the schematic drawing, by rollers or wheels 20 which rest on base member 22 for movement in either direction, indicated by arrows 25, toward or away from the plane of the transparency 10. An important aspect of the present invention is the placement of a photocell 24 in the path of the light beam 12, between the light source 14 and transparency 10. The photocell 24 is fixed with respect to light source 14 and is schematically shown as being supported by a cantilever support member 26 fixed to support means 18 and extending at right angles therefrom. Thus, photocell 24 acts to measure the light intensity of light beam 12 which emanates from light source 18. The intensity of light beam 12 may be held constant by manually adjusting the intensity of light source 14. The intensity of light beam 12 may be automatically kept constant by employing a suitable electric circuit in a conventional manner. For best results, the light source 14 should be of 3200° to 3800° Kelvin type. Preferably, the voltage supplied should be set to provide 3200° Kelvin temperature output.

Another important feature of the present invention is the means for ensuring that the intensity of light transmitted by the transparency 10 to the image plane of the photographically sensitive media used to form the reproduction is kept constant regardless of the particular interference factor of the transparency so photographed. In order to measure the light intensity passing through the transparency 10, a light meter 28 is positioned on the side of the transparency 10 opposite that of light source 14. It have been determined that for best results, a light intensity of between 15 and 20-foot candles is apt to produce suitable photocopies at the image plane and provide the desired color contrast, which in the case of each reproduction produced by the apparatus is to be held constant. In order to produce this constant light intensity on the side of transparency 10 opposite that of light source 14, the movable base 16 is moved on rollers 20 toward or away from the transparency to a point until the desired light intensity of 15 to 20-foot candles is transmitted through the transparency 10, regardless of whether the system makes use of a conventional camera or enlarger. Once the desired light intensity of, say, 15-foot candles is indicated by the light meter 28, the position of the constant temperature light source 14 remains fixed with respect to the transparency 10. In order to focus the transmitted picture from the transparency 10 to the photographically sensitive reproduction surface 30 at the desired image plane a conventional lens 32 is employed. The lens diaphragm 34 is adjusted to the point where an appropriate indicator, such as photocell 36 indicates the desired light intensity (15 to 20-foot candles) at the focal plane 30. The photocell light meter 36, provides a reading of light intensity in the form of a small electrical current, and it has been determined that the best results are obtained with a reading of from 15 to 20 microamps at the focal plane of both the camera and enlarger. This 15 amps corresponds to the desired 15 to 20-foot candle reading of meter 28, thereby establishing the required controls to effect the color reproduction in the form of a color positive or negative characterized by constant contrast and density range. As in all photographic processes, appropriate shutter means (not shown) are provided with the opening and closing of the shutter timed in the manner of conventional photographic techniques to momentarily expose the sensitized surface at the focal plane 30 to the transmitted picture from the transparency 10 after removal of light meter 28. The photographic sensitized surface 30 is in the form of a conventional support or vehicle carrying sensitized silver in the form of either a color negative or positive material. The photographic sensitive vehicle 30 is developed for a specific period of time in a constant temperature solution or developer under controlled conditions. Thus, under exact controlled conditions, which are duplicated for each color reproduction so processed, the identical procedure is used regardless of the interference factor of each transparency 10 processed to provide a series of color negatives and/or positives at the image plane 30 having the same constant color contrast and density range.

Referring to FIGURE 2, there is shown a slightly different arrangement, which, however, makes use of the same controlled conditions for effecting constant light transmission through the apparatus to the image plane carrying the sensitized photographic reproduction surface. However, in this case, instead of a transparency 10, opaque color originals which may be watercolors or other colored art are sequentially positioned with respect to a pair of light sources 52 spaced from each original 50. The light sources 52 act to diagonally direct light beams 54 onto the surface of the opaque original 50. For illustration purposes, the light beams are shown to be at an angle of 45° to the surface of the original 50. The light beams 54 in striking the surface of the original 50 are reflected with a portion of the light reflected outwardly at an angle of 90° to the surface of the original 50 toward the conventional focusing lens 56. In like manner to the embodiment shown in FIGURE 1, either one or both of the light sources 52 have fixed thereto, a photoelectric cell 58 which is positioned in the path of the light beams emanating from source 52 and acts to measure light intensity being directed onto the surface of the original 50 for reflection therefrom. In this manner, the light sources 52 may be adjusted electrically to provide light output of constant intensity which, in the case of copy reflection methods of FIGURE 2, should be in the range of 20 to 35-foot candles as indicated by meter 58.

A second light meter 60 is positioned in the path of the reflected light from the surface of the original 50 and is used to measure the intensity of the reflected image and thereby provide constant light intensity for the light transmitted from the original 50 to the focal plane 62 carrying either the positive or negative photosensitized surface on a suitable carrier or vehicle. Again, a lens diaphragm 64 is adjusted to provide an appropriate indication for the light transmitted to the focal plane 62 which, for best results, should be in the neighborhood of 15–20 microamps, this current reading being achieved by conventional light meter 70 of the photocell type. Again, controlled shutter operations and developing process techniques result in the continuous production of appropriate negatives or positives at the focal plane 62 in which the positive or negative reproductions have constant contrast and density range. The light intensity of the reflected light from the surface of the opaque original 50 and, which is detected by light meter 60, may be varied by moving the light sources 52 closer or further away from the relatively stationary original 50. As in the apparatus of FIGURE 1, the temperature of the light source 52 is kept constant. Preferably a 3200° Kelvin light source is utilized.

As mentioned previously, the method and apparatus of the present invention has particular applicability to a multicolor offset printing process in which it is necessary to produce color negatives and color separation positives in this order. It is important to note that the need for color separation negatives is completely eliminated by the present invention in a process of this type.

After producing the color negatives by the method of the present invention through either apparatus shown in FIGURES 1 and 2, it is necessary to produce appropriate color separation positives. In FIGURE 3, the present invention is shown as applied schematically to a contact printing apparatus of otherwise conventional type. In using the apparatus of FIGURE 3, the original color negative or negatives which is characterized by constant contrast and density range is placed in position on a clear sheet of acetate according to furnished layouts. The acetate 70 carrying the negative is placed on a glass support 80 which is positioned by means of side support members 82 on top of a conventional vacuum frame 84. The color negative on the acetate 70 is shown spaced from the glass support member 80 but, in actuality, rests on top of it. In one particular form, the glass support member 80 is positioned three inches above the top of the vacuum frame 84, but this spacing is only necessary to allow a light meter in the form of probe 86 to be positioned between the glass support 80 and the top of the vacuum frame 84. An appropriate, constant temperature 3200° Kelvin light source 88 is positioned above the apparatus and includes a photocell 90 which is fixedly supported with respect to light source 88 by support member 92, the photocell 90 beign in position in the path 94 of the light beam emanating from source 88. A battery 96 is coupled through an adjustable rheostat 98 to the light source for varying the current thereto, and, therefore, the light intensity of light beam 94 is directed upon negative color carrier 70. The light intensity of the beam 94 emanating from light source 88 is set to the desired constant value by adjustment of rheostat 98 and a light intensity at this point remains constant for each and every color separation positive subsequently produced regardless of the interference factor of each color negative used. The light source is adjusted to transmit a constant intensity light beam through the color negative of the value, which depends, of course, upon the interference factor. Movement of light source 88 vertically with respect to the vacuum frame may produce this result. The light meter 86 for measuring the intensity of light passing through the color negative is again of the conventional type employing a photocell circuit in which the current reading of the photocell remains constant at 20 microamps for instance, by adjusting the position of the light source 88 with respect to the frame 84 to provide the constant, preferred intensity at the point immediately above vacuum frame 84. Thus, by keeping the light transmission at a constant desired value, constant contrast and density range for each and every color separation print are achieved. Appropriate fillters (not shown) are positioned adjacent light source 88 and the interference factor produced by the filter is automatically taken into account.

After the intensity of light source 88 in its position is adjusted to effect a light transmission value at the area immediately above the vacuum frame 84 of desired constant value in foot candles or in correlated microamps, the negative color layout and its glass support, including the assembly of elements 70, 80 and 82, are removed from the top of the vacuum frame 84. At the same time, the movable probe 86 is removed and the color negative layout 70 is positioned in contact with the sensitized photographic media (not shown) and the resulting laminate is then placed within the vacuum frame for contact photographic reproduction in a conventional manner. Again, the same constants are maintained with regard to exposure and development so that a resulting series of color separation positives are achieved with constant contrast and density range. It is obvious that in the making of color separation positives the necessity of the use of conventional color correction means, etc., are eliminated. Using a combination of the apparatus shown in FIGURE 1 or 2 with that of FIGURE 3, the method of the present invention enables the operator to have complete control at all times of color contrast, density range, light intensity, light output and light temperature. This results in a highly uniform series of prints.

In order to perfect a technique which is easily usable by relatively inexperienced laymen, it is highly advantageous to employ a method and apparatus in which the operator merely has to note one or more meter readings which he holds to a constant value regardless of the particular color separation positives being produced and further, regardless of the specific commercial emulsion acting as a sensitized photographic material. In the improved apparatus shown in FIGURES 4 through 6, the technique of the present invention is advantageously applied to a contact printing apparatus which is basically identical to that schematically shown in FIGURE 3. Referring to FIGURE 4, it is noted that the apparatus includes a fixed table or stand 100 having a flat tabletop 102 supported by a pair of sidewalls 104 having legs 106 resting upon the floor. The apparatus may include a transverse shelf 108 upon which is supported an electrical motor 110, a gear reduction means 112 and a drive pulley 114. At the rear of the cabinet is an upstanding panel 116 which supports the various controls for the apparatus as well as the indicating meters. Located centrally behind a panel is a vertical beam 118 which carries a rotatable pulley 120 within a slot formed therein, the pulley 120 operating in conjunction with pulley 114 to carry an endless chain 122. The endless chain has affixed thereto a lamp assembly 126 which includes a constant temperature lamp or light source in the form of a 3500° Kelvin light source which acts to direct a light beam downwardly from a lens structure 128 upon the horizontal surface of table 102. As seen in FIGURES 4 and 5, a rotatable filter assembly 130 is positioned adjacent lens assembly 128 for rotation about a vertical axis through mounting pin 132 to sequentially place the required red, green and blue filters 134, 136 and 138 between the light source within lamp assembly 126 and tabletop 102. Opening 140 does not include a colored filter and may be used in photo reproduction using other than color separation techniques. Energization of the 3500° Kelvin light source within lamp assembly 126 is achieved in much the same manner as indicated in the FIGURE 3 embodiment. A source of voltage (not shown) is manually controlled through rotation of knob 134 on panel 116, the knob preferably being connected to a rheostat (not shown) which is coupled to the lamp within assembly 126 so as to vary the voltage across the lamp, the voltage being indicated by voltmeter 136 placed immediately to the right of the control knob 134 on the panel. A switch 138 is also placed in the circuit to turn the lamp within assembly 126 on and off. The voltage across light source 126 is adjusted to provide a 3500° Kelvin temperature output rather than 3200° Kelvin as in the prior embodiments. The apparatus further includes a manual photocell in the form of a probe 140 which is connected by flexible electrical lead 142 to an indicating meter 144 on the right-hand side on panel 116. A switch 146 acts to electrically energize the photocell circuit including probe 140. A pilot lamp 148 indicates energization of the photocell detecting circuit, the light being on when the circuit is operative. Red, green and blue lamps 150, 152 and 154 respectively are positioned in series with the pilot lamp 148 and indicate, when lit, the selection of the appropriate compensation circuit for the photocell measuring system depending upon the selected filters 134, 136 and 138, for producing the desired monotone color separation positives. In like manner to the apparatus of FIGURE 3, a pair of vertical support members 156 act to support a transparent glass support or photo 158 carrying the color negative from which the color separation positives are being made.

Referring to FIGURE 6, there is shown the electrical circuit associated with those elements of the apparatus forming the photoelectric probe including photocell 140. The photocell 140 is shown as being coupled to meter 144 by means of lead 142. A second lead 160 from the meter 144 is connected to the source of voltage 162 through the double pole single throw switch 146 to complete an electrical circuit through lead 164 to the other side of photocell 140. Connected in parallel with the meter 144 is a variable resistance network indicated generally at 166, the resistance network including three individually variable and individually selectable resistances or rheostats 168, 170 and 172. A selector switch includes three fixed contacts 174, 176 and 178 and a single movable contact member 180 for selective energization of shunt circuits including correlated variable resistors 168, 170 and 172.

Independent source of voltage 182 is connected to primary winding 184 of a transformer 186 by the simultaneous closure of the single throw double pole switch 146 which acts to energize the probe circuit. The secondary winding 188 of transformer 186 acts to supply current to pilot light 148 and the individual indicating lamps 150, 152 and 154 depending upon the position of movable contact member 190 which selectively engages fixed contact members 192, 194 and 196 associated with red indicating lamp 150, green indicating lamp 152 and blue indicating lamp 154 respectively. The rotatable control knob 198 shown on the right-hand side of panel 116 in FIGURE 4 simultaneously moves the movable contact 180 and movable contact 190 and is shown in FIGURE 6 by dotted line 198 so that placing of the compensating resistances provided by rheostats 168, 170 and 172 may be selectively placed in shunt with the meter 144 and voltage source 162. Thus the meter reading, i.e., the position of needle 200 on meter 144 will always be constant regardless of which color separation positive is being processed, and further regardless of the interference factor of the individual color negative positioned on temporary support assembly 155 during the light intensity transmission measurement.

As mentioned previously, each emulsion has different sensitivity characteristics, that is; the emulsions which are commercially manufactured by the various manufacturers, such as the Eastman Kodak Company, Ilford Company, etc., are not equally as sensitive to blue light or green light or red light. Between emulsions of different manufacturers, each emulsion may be differently affected by light of any one specific color. For instance, reference to FIGURE 7 shows a wedge spectrogram of color sensitivity of Ilford FP3 roll film. As is readily indicated, the Ilford film is highly sensitive to green and red light, but not so sensitive to blue light. Reference to FIGURE 8 shows a wedge spectrogram of conventional panchromatic film of the Eastman Kodak Company and indicates different color sensitivity for the different colors and with respect to the Ilford product represented by the wedge spectrogram of FIGURE 7. The Eastman panchromatic film is highly sensitive to blue color but not so sensitive to green and red. Thus, it is readily apparent that if the apparatus is going to be used by relatively inexperienced laymen, it is most desirous that a layman looking at the meter 100 on panel 116 will adjust the position of the light source assembly 126 with respect to the probe 140, whereby the position of the indicating needle 200 will remain constant regardless of the fact that the light intensity passing through the color negative in the production of the color separation positives and as a result of interference both of the negative 202 and filter assembly 130 differs, but compensation has been achieved by means within the detecting network. The means, as mentioned previously, encompasses the adjustable resistance network 166 in the form of the individual rheostats 168, 170 and 172. The operator, in determining the sensitivity characteristics of the emulsion being used in the contact photographic reproduction process, merely adjusts the position of the movable contact member 204 for the correct setting which correlates to the production of a series of red color separation positives characterized by constant contrast and density range and likewise makes the appropriate setting of rheostats 170 and 172 by movement of movable contact members 206 and 208 respectively to the desired positions. In this manner, compensation for specific color sensitivity of the particular emulsion, that is, for example, an Ilford emulsion is achieved. Now, if the operator changes from a film having one characteristic to an emulsion or film having another characteristic such as changing to Eastman Kodak panchromatic film having the characteristic shown by the wedge spectrogram in FIGURE 8, the movable contact members 204, 206 and 208 must be changed so as to produce different rheostat settings for rheostats 168, 170 and 172 which correlate to the sensitivity of the film to the three colors, blue, red and green. Thus, with the apparatus shown in FIGURES 4, 5, and 6 the operator merely has to look at the photocell indicating meter 144 on panel 116 and adjust the position of the constant light intensity light source 126 vertically by energization of motor 110 whereupon the movement of the needle 200 to the predetermined, constant position indicates the correct position of the light source 126 with respect to a temporary support 155 and inferentially the vacuum plate (not shown).

The present application has primary applicability to the production of color separation positives characterized by constant color contrast and density range in which the necessity of color separation negatives is completely eliminated. This system has application to the production of such color separation positives regardless of the interference factor of the color originals, and has special application to the production of a layout employing a number of color prints, which may be either negatives or positives or intermixed. The methods and apparatus of the present invention may be best appreciated by discussing in detail the preparation of multiillustration layouts. For instance, four illustrations in the form received in the plant which have variable density and for the purposes of this example will be described as being transparencies are received in the plant in the transparency form. It is necessary to size each transparency to the layout furnished. This is done by first placing the transparency in front of the lens of the camera and adjusting the distance between the lens and the image plane to achieve the desired size. It might be stated that the system described herein makes use of the apparatus shown in FIGURES 1 and 4 of the drawings. The constant temperature light (3200° Kelvin) is moved towards and away from the transparency and the light intensity passing through the transparency is measured until the light intensity so transmitted reaches the desired value which for illustration purposes may be 20-foot candles or 10 microamps. The desired meter reading is to be held constant regardless of which of the four transparencies are being processed. The purpose of moving the light source is to arrive at a constant light transmission value for each transparency positioned between the light source and the lens. The operator then transports the meter from its position between the transparency and the lens to a position at the image plane on the opposite side of the lens, and the lens is adjusted until the light transmitted through the lens at the image plane reaches the desired value, which again, as in this case, would be the desired 20-foot candles or 10 microamps which is the set value for light transmission. Thus, the constant light intensity is provided at the image plane. The next step is placing the sensitive film at the image plane and by using constant exposure time, which in this illustration is 40 seconds produce a color negative having constant contrast and density range. This same procedure is then used for the remaining three color transparencies, thereby producing color negatives having constant contrast and density range. The density range and color contrast desired is determined by the particular graphic art process, such as photoengraving, lithography, or photo rotogravure. It is important, however, to remember that once the particular graphic art process is known, the desired contrast and density range remains fixed and this is what the operator achieves by using the method of the present invention.

The four color negatives are then placed on a transparent plate and the desired configuration is set forth by the customer as far as the layout is concerned and this temporary support is positioned above the vacuum frame in the manner set forth in FIGURE 4. The present apparatus is capable of measuring 100% of the light transmitted in accordance with each wave band, that is, readings of 100% blue, 100% red and 100% of the green are achieved. While in the production of the color negatives, a constant temperature of 3200° Kelvin light source was used, in the production of color separation negatives or positives, it is necessary to compensate for the failure of the filters to filter out all of the unwanted colors. For instance, when making the green separation positives or negatives, some of the blue will spill over and be passed by the filter. Likewise, when making the blue, green and red colors are being passed, and when making the red color separation negative or positive, a great amount of the blue is being passed through the filter. In order to compensate for this, a 3500° Kelvin light source is used rather than the 3200° Kelvin light source used previously with respect to the apparatus shown in FIGURES 1 and 2. To make a blue color separation positive or negative, we place the red filter in the filter holder or assembly 130 between the light source emanating light from lens 128 and the probe 140 and the color negative 202 placed on the temporary support assembly 155. The light source 126 is moved vertically by energization of the circuit including the electrical motor 110. Since we are using the red filter, the compensation switch 198 is rotated to a position wherein the rheostat 168 places the desired shunt resistance across the meter. At the same time, the red indicator lamp 150 is lit indicating the use of the red filter and bringing the photoelectric sensing means to the range of the spectrum for measuring the density of the red light through the colored negative layout. The constant temperature light source within assembly 126 is moved vertically toward and away from the temporary support until the meter indicates the constant light intensity at the exposing plane, which, in this case, is a meter reading at 144 of 20 microamps, the probe 140, of course, being on the opposite side of the temporary support holding the color negative layout.

To provide the blue color separation positive or negative, the temporary support assembly 155 is removed after the desired constant intensity meter reading of 20 microamps is achieved; and the color negative is placed directly on top of the film or sensitive panchromatic material. The sensitive emulsion is exposed for a time-correlated to the desired density range for the particular inks with which the printers will be working with. For instance, 30 seconds may be appropriate exposure time. This exposure time will remain constant for each and every color separation negative or positive processed regardless of the interference factor of the color negative 202 which is being used, or the specific blue, red or green monotone separation positive or negative being desired. Steps are repeated in the preparation of the red color separation positive or negative and the yellow separation positive or negative using, in sequential manner, the green filter 136 and the blue filter 138, by suitably rotating the assembly 130. Since color negatives having constant contrast and density range have been used, the net result is to produce monotone positive color separations which are also characterized by constant density range and color contrast.

It is important to note that in each step of the process, the intensity of light beam transmitted is held constant. This does not mean that the value of light intensity between the light source and the interference element 10 as in FIGURE 1 is equal to the intensity of light between the interference element 10 and lens 32 or adjacent the image plane 30, but merely that the measurements taken by meters 24, 28 and 30 in this apparatus, for instance, will be constant for any series of color originals processed by the apparatus.

The method and apparatus of the present invention has stressed application to the production of continuous tone negatives or positives. Of course, the invention has broad application to the production of direct screen negatives and direct screen positives for subsequent use in offset photoengraving or rotogravure processes. Thus, their use would be highly advantageous in making undercolor removal masks, thereby rendering an improvement in color fidelity. It is also important to note that tone and color corrections may be made by varying the position of the light source or the voltage applied thereto to effect simplified correction.

It is also important to note that the movement of the light source determines contrast and the selection of the lens aperture determines intensity.

While there have been shown and described and pointed out the fundamental novel features of the invention as applied to preferred methods employing the various illustrative embodiments, it will be understood that various omissions and substitutions and changes in the form of and detail of the devices as illustrated and in their method of operation may be made by those skilled in the art without departing from the spirit of the invention. It is, therefore, the intention to be limited only as indicated by the scope of the following claims.

What is claimed is:

1. Apparatus for producing a series of improved color photo reproductions having constant contrast and density range comprising: means for fixedly positioning a color original at an object plane spaced with respect to a photosensitized surface at an image plane, means for positioning a constant temperature light source for illuminating said color original to effect transmission of an image from said object plane to said image plane, means carried by said light source and fixed thereto for measuring the light intensity of said light source, and means positioned between said object plane and said image plane for determining the intensity of light transmitted from said object plane to said image plane, and means for moving said light source with respect to said color original whereby the value of light intensity transmitted from said original to said photosensitized surface at said image plane may be maintained constant regardless of the interference factor of each original so processed, and means for exposing respective photosensitized surfaces under constant, controlled conditions.

2. A method of producing a series of improved color separation prints having constant contrast and density range comprising the steps of: illuminating sequentially, a series of color originals to effect transmission of light from each original to an image plane including respective photosensitized surfaces spaced therefrom, measuring the intensity of transmitted light from each original, adjusting the position of said light source with respect to said original to maintain said transmitted light constant regardless of the interference factor of each original so processed, exposing respective photosensitized surfaces under controlled constant conditions to there produce a series of color negatives having constant contrast and density range, illuminating sequentially, the series of color negatives so produced to effect transmission of light from each of said color negatives to an associated image plane spaced therefrom, positioning sequentially, color filters to intersect said light, adjusting the position of said light source with respect to each color negative and associated filter while measuring the intensity of transmitted light at said image plane by photoelectric light sensing means to maintain the light transmitted to said image plane constant regardless of the interference factor of each original color negative so processed and its respective individual filter, selectively adjusting said photoelectric light sensing means for the emulsion characteristics of each photosensitized surface being used, and exposing respective photosensitized surfaces at said image plane under controlled constant conditions to thereby provide color separation prints characterized by constant contrast and density range.

3. A method of producing a series of improved color separation prints having constant contrast and density range comprising the steps of: illuminating sequentially a series of color originals with a constant temperature, constant intensity light source to effect transmission of light from each original so processed to an image plane spaced therefrom, adjusting the position of said light source with respect to said original to maintain said transmitted light at said image plane constant regardless of the interference factor of each original so processed, exposing color negative emulsions at said image plane under controlled constant conditions to thereby produce a series of color negatives having a constant contrast and density range, subsequently illuminating sequentially the series of color negatives so formed with a constant temperature, constant intensity of light source to effect transmission of light from each of said color negatives to an image plane spaced therefrom, positioning sequentially, a series of color filters between each colored negative and the image plane and adjusting the position of said light source with respect to each color negative while measuring the intensity of the transmitted light at said image by photoelectric light sensing means to maintain the light transmitted to the associated image plane constant regardless of the interference factor of each color negative so processed and the individual filter used therewith, placing a series of color sensitive emulsions at said image plane, selectively adjusting said photoelectric light sensing means for the emulsion characteristics of the particular emulsion being used, and exposing the emulsions under controlled constant conditions to produce a series of improved color separation prints characterized by said constant color contrast and density range.

4. Contact photo reproduction apparatus comprising: a table for supporting a vacuum frame thereon, an instrument supporting panel positioned at the rear of said table and rising vertically therefrom, an elongated vertical support member positioned behind said table and said vertical panel, a constant temperature, constant intensity light source, means for adjustably positioning said light source on said vertical support member, means for moving said light source toward and away from said table, a rheostat mounted on said panel for varying the voltage across said light source, a meter positioned on said panel for indicating the voltage applied to said light source, a temporary transparent support, said temporary transparent support being positioned on said table and spaced therefrom, said transparent support acting to hold a color negative having constant contrast and density range, a photoelectric probe, means for selectively postioning said probe beneath said temporary support, a light intensity meter positioned on said panel, means for interposing, in a sequential manner, various color filters between said light source and said color negative on said temporary support, a source of electrical energy, means for coupling said probe and said meter to said energy source whereby said meter indicates the relative light intensity passing through said color negative and said filter, emulsion sensitivity compensation means correlated to respective color filters, and means for selectively connecting said compensation means in the light measuring circuit whereby said operator adjusts the position of said light source with respect to said color transparency to obtain constant meter reading regardless of the interference factor of each transparency, associated filter and the individual color sensitivity characteristic of the photosensitive emulsion used therewith.

5. The apparatus as claimed in claim 4 further including means for variably changing the respective color compensation means for each of said red, blue and green filters to effect correlation between said light intensity measuring device and the particular commercial emulsion being processed whereby said light intensity meter reading remains constant regardless of change in commercial emulsion.

6. In a color separation photographic reproduction apparatus including a conventional vacuum frame, a constant intensity, constant temperature light source and a series of color filters selectively positioned between said light source and said vacuum frame, the improvement comprising: a photoelectric light intensity measuring circuit for the production of color separation photo reproductions having constant contrast and density range, said circuit including a photoelectric probe, means for positioning said probe beneath an original color negative to measure the light transmitted through the filter and said negative, a meter indicating current flow through said circuit correlated to intensity of light being measured, a source of voltage connecting said meter to said photocell probe, an emulsion density compensation means in the form of selectively energizable rheostats for each color filter used and means for connecting said rheostats selectively into said measuring circuit whereby said operator adjusts the position of said light source with respect to said color negative to maintain said meter readings constant regardless of the interference factor of each original transparency so processed and the correlated color filter being used.

7. Apparatus as claimed in claim 5 wherein said emulsion characteristic compensation means comprises shunt circuits including three variable resistances, means for connecting a selected variable resistance in parallel with said meter and in series with said voltage source depending upon the specific color filter positioned in the path of said constant intensity, constant temperature light source to thereby produce color separation prints having constant contrast and density range.

8. The apparatus as claimed in claim 7 wherein each of said selectively energizable resistances includes means to vary the resistance thereof to correlate the resistance with the specific single color emulsion characteristic of the particular commercial emulsion being used to produce the color separation print whereby the reading of the light intensity meter is maintained constant regardless of which commercially manufactured emulsion and which color filter are being used.

References Cited

UNITED STATES PATENTS

| | | | |
|---|---|---|---|
| 2,928,327 | 3/1960 | Blackmer et al. | 88—24 X |
| 3,031,922 | 5/1962 | Stadler | 88—24 |
| 3,100,419 | 8/1963 | Clapp | 88—24 |

NORTON ANSHER, *Primary Examiner.*

R. A. WINTERCORN, *Assistant Examiner.*